United States Patent
Mester et al.

(10) Patent No.: US 9,959,545 B2
(45) Date of Patent: May 1, 2018

(54) MONITORING OF EVENTS AND KEY FIGURES

(71) Applicants: Maren Mester, Waghausel (DE);
Melanie Kientz, Ladenburg (DE);
Andre Klahre, Schwetzingen (DE);
Wolfgang Walter, Heidelberg (DE)

(72) Inventors: Maren Mester, Waghausel (DE);
Melanie Kientz, Ladenburg (DE);
Andre Klahre, Schwetzingen (DE);
Wolfgang Walter, Heidelberg (DE)

(73) Assignee: SAP SE, Walldorf (DE)

( * ) Notice: Subject to any disclaimer, the term of this patent is extended or adjusted under 35 U.S.C. 154(b) by 494 days.

(21) Appl. No.: 14/539,374

(22) Filed: Nov. 12, 2014

(65) Prior Publication Data

US 2016/0132899 A1    May 12, 2016

(51) Int. Cl.
*G06Q 30/02*    (2012.01)

(52) U.S. Cl.
CPC ................ *G06Q 30/0201* (2013.01)

(58) Field of Classification Search
None
See application file for complete search history.

(56) References Cited

U.S. PATENT DOCUMENTS

| | | |
|---|---|---|
| 6,336,139 B1 | 1/2002 | Feridun et al. |
| 8,065,618 B2 | 11/2011 | Kumar et al. |
| 8,117,078 B2 | 2/2012 | Abo-Hasna et al. |
| 8,146,103 B2 | 3/2012 | Schmidt et al. |
| 8,473,317 B2 | 6/2013 | Santoso et al. |
| 8,504,397 B2 | 8/2013 | Vempati et al. |
| 8,612,285 B2 | 12/2013 | Nos et al. |
| 2002/0099579 A1 | 7/2002 | Stowell et al. |
| 2003/0126181 A1* | 7/2003 | Young ............. G06O 10/10 718/100 |
| 2004/0117802 A1* | 6/2004 | Green ............. G06F 11/3006 719/318 |
| 2005/0021348 A1* | 1/2005 | Chan ............. G06Q 10/067 706/45 |

(Continued)

FOREIGN PATENT DOCUMENTS

| | | | | |
|---|---|---|---|---|
| WO | WO-02073860 A2 * | 9/2002 | ............. | G06Q 10/06 |
| WO | WO-2012003249 A2 * | 1/2012 | ............. | G06Q 10/10 |

OTHER PUBLICATIONS

Kang, Jin Gu, and Kwan Hee Han. "A business activity monitoring system supporting real-time business performance management." Convergence and Hybrid Information Technology, 2008. ICCIT'08. Third International Conference on. vol. 1. IEEE, 2008.*

(Continued)

*Primary Examiner* — Thomas L Mansfield
*Assistant Examiner* — Derick J Holzmacher
(74) *Attorney, Agent, or Firm* — Mintz Levin Cohn Ferris Glovsky and Popeo, P.C.

(57) ABSTRACT

A system, a method, and a computer program product for monitoring of events and key figures are disclosed. An event in a plurality of events associated with a business process is identified. The identified event is monitored. A business value of the identified event is determined in real time. Based on the determined real-time business value, at least one key figure associated with the monitored event is retrieved and displayed in a user interface.

12 Claims, 7 Drawing Sheets

(56) References Cited

U.S. PATENT DOCUMENTS

| | | | |
|---|---|---|---|
| 2005/0021354 A1* | 1/2005 | Brendle | G06F 9/465 717/100 |
| 2005/0138111 A1* | 6/2005 | Aton | G06F 11/3476 709/201 |
| 2005/0171810 A1 | 8/2005 | Klein et al. | |
| 2005/0216504 A1* | 9/2005 | Delvat | G06F 3/0481 |
| 2007/0005388 A1 | 1/2007 | Busch et al. | |
| 2007/0162500 A1* | 7/2007 | Herwadkar | G06Q 10/06 |
| 2007/0168496 A1* | 7/2007 | Bansod | G06F 11/008 709/224 |
| 2008/0215389 A1* | 9/2008 | Heidasch | G06Q 10/0633 705/7.27 |
| 2008/0255891 A1* | 10/2008 | Stone | G06Q 10/06 705/400 |
| 2009/0024594 A1 | 1/2009 | Nolan et al. | |
| 2009/0043799 A1* | 2/2009 | Morris | G06F 9/4446 |
| 2009/0055770 A1* | 2/2009 | King | G06Q 10/10 715/810 |
| 2009/0083131 A1* | 3/2009 | Nos | G06Q 10/10 705/7.29 |
| 2011/0282704 A1* | 11/2011 | Graeber | G06Q 10/06 705/7.11 |
| 2012/0005690 A1* | 1/2012 | Houck | G06Q 10/10 719/318 |
| 2012/0144368 A1* | 6/2012 | Schwerk | G06Q 10/10 717/120 |
| 2012/0166234 A1* | 6/2012 | Drittler | G06Q 10/063 705/7.11 |
| 2012/0284287 A1* | 11/2012 | Klinker | G06Q 10/067 707/754 |
| 2013/0081065 A1 | 3/2013 | Sharan et al. | |
| 2013/0159060 A1* | 6/2013 | Steinbach | G06Q 10/06 705/7.36 |
| 2013/0254711 A1 | 9/2013 | Sievert et al. | |
| 2013/0297361 A1 | 11/2013 | Shami et al. | |
| 2014/0095537 A1* | 4/2014 | Park | G06F 17/30442 707/770 |
| 2014/0310034 A1* | 10/2014 | Li | G06Q 10/06393 705/7.11 |

OTHER PUBLICATIONS

Schiefer, Josef, Beate List, and Robert M. Bruckner. "Process data store: A real-time data store for monitoring business processes." International Conference on Database and Expert Systems Applications. Springer, Berlin, Heidelberg, 2003.*

Wetzstein, Branimir, et al. "Monitoring and analyzing influential factors of business process performance." Enterprise Distributed Object Computing Conference, 2009. EDOC'09. IEEE International. IEEE, 2009.*

Cherbakov, Luba, et al. "Impact of service orientation at the business level." IBM Systems Journal 44.4 (2005): 653-668. (Year: 2005).*

Sadiq, Shazia W., Olivera Marjanovic, and Maria E. Orlowska. "Managing change and time in dynamic workflow processes." International Journal of Cooperative Information Systems9.01n02 (2000): 93-116. (Year: 2000).* zur Muehlen, Michael, and Robert Shapiro. "Business process analytics." Handbook on Business Process Management 2. Springer Berlin Heidelberg, 2010. 137-157. (Year: 2010).*

Kang, Jin Gu, and Kwan Hee Han. "A business activity monitoring system supporting real-time business performance management." Convergence and Hybrid Information Technology, 2008. ICCIT'08. Third International Conference on. vol. 1. IEEE, 2008. (Year: 2008).*

* cited by examiner

MONITORING OF EVENTS AND KEY FIGURES

TECHNICAL FIELD

This disclosure relates generally to data processing and, in particular, to monitoring of events and key figures.

BACKGROUND

In today's world, data is vital to operations of many businesses, whether large or small. On regular basis, businesses rely, use, process and/or store vast amounts of data that can be related to businesses' finances, operations, logistics, customers, and many other aspects of their operations. Proper storage of data and fast access to such data are important to smooth operations of the businesses.

Occurrences and issues in a business process and system state often need to be made visible in a unified tool and, in addition, may need to be ranked based on importance of the business process to a particular business. The state of the business objects/data/systems may need to be evaluated at a point of time, such as, at the beginning and/or during investigation of various issues that may be associated with a business process. However, the conventional system do not provide for such evaluation and/or monitoring of issues that allow businesses real time determination of which issue to resolve first and how it would affect their operations.

SUMMARY

In some implementations, the current subject matter relates to a computer-implemented method for monitoring of events and key figures. The method can include identifying an event in a plurality of events associated with at least one business process, monitoring the identified event and determining in real time a business value of the identified event, and retrieving and displaying, based on the determined real-time business value, at least one key figure associated with the monitored event in a user interface. At least one of the identifying, the monitoring, and the retrieving can be performed by at least one processor of at least one computing system.

In some implementations, the current subject matter can include one or more of the following optional features. The business value can be determined based on an impact of the identified event on the at least one business process. The user interface can display the plurality of events in the order beginning with a highest impact on the at least one business process.

In some implementations, at least one key figure can include at least one of the following: a static key figure generated prior to runtime of the at least one business process and a dynamic key figure generated at runtime of the at least one business process. At least one key figure can be stored in at least one memory and retrieved by a backend system communicatively coupled to the user interface for displaying on the user interface. The business value can be a monetary value.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter provide methods, systems, articles or manufacture, and the like that can, among other possible advantages, provide for monitoring of events and key figures.

In contrast to existing solutions, where for the purposes of monitoring, logs and/or aggregated data that can be outdated are used, the current subject matter event monitoring can determine, in real-time, the current state of business objects/data/processes and/or systems. Further, the current subject matter's event monitoring can calculate a monetary value that can express influence on the business if a particular issue is resolved or not resolved. The current subject matter's event monitoring can determine items of different structure (i.e., key figures, attributes, parameters, etc.) and can retrieve and display those in a unified user experience. Using generic layers and interfaces, definition of key figures can reduce the effort for the customer and make it possible to use different sources to supply the relevant data. Due its flexible design and decoupling of its components, the current subject matter can be used in one system and/or across different systems independent on their deployment model like on premise and/or cloud.

In some implementations, the current subject matter relates to real-time monitoring of events and/or key figures and determining a value (e.g., a business value, a monetary value, and/or any other value) of a particular event and/or a key figure. The value determination can be made in relation to other events, key figures, business processes, business objects, business process system, and/or any combination thereof.

Figure 1:
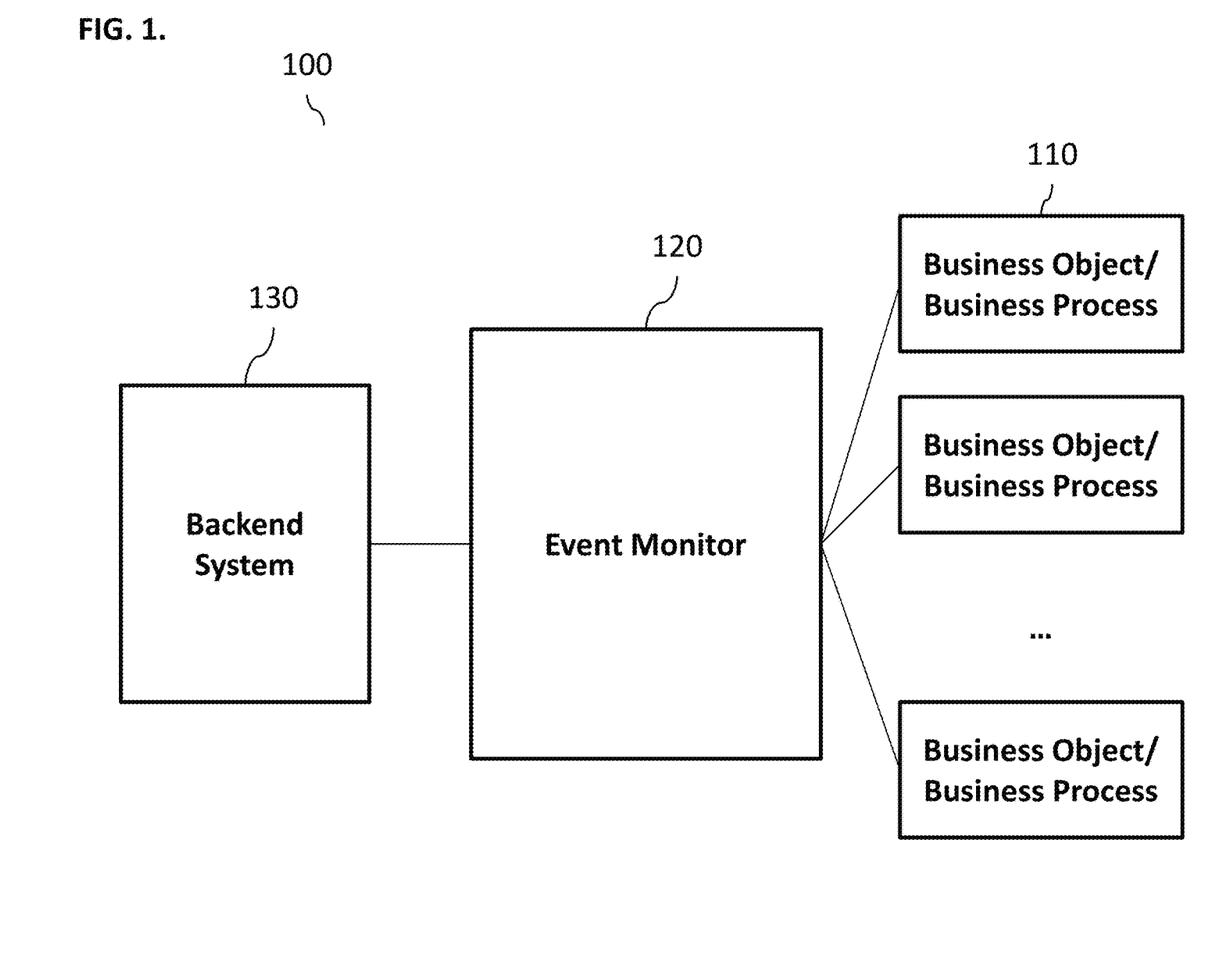
FIG. 1 illustrates an exemplary system for monitoring business processes and/or business objects, according to some implementations of the current subject matter.

FIG. 1 illustrates an exemplary system 100 for monitoring business processes and/or business objects, according to some implementations of the current subject matter. The system 100 can include one or more business processes and/or business objects 110, an event monitor 120, and a backend system 130 (which can include one or more servers, a database, software, hardware, and/or any other computing components). Some non-limiting examples of the business processes and/or business objects can include software applications, data centers, storage devices, servers, various computing devices, and/or any other processes and/or objects.

The event monitor 120 can be communicatively coupled to the backend system 130 (discussed in more detail below) and can monitor business processes and/or business objects 110. The monitoring performed by the event monitor 120 can include determination of a status of a particular business object and/or process, where the status can relate to execution of a particular object/process, error resolution, development status, production status, etc. The event monitor 120 can monitor a specific object/process and/or a group of objects/processes and/or an entire system. The event monitor can be software, hardware, and/or a combination of software and hardware. It can further include various networking and/or communication capabilities.

In some implementations, the event monitor 120 can provide an overview of one or more events and their statuses. The events can be associated with a particular object/process and/or a group of objects/processes and/or an entire system. The events can relate to a simple status indication and/or a problem that object(s)/process(es) may be having. Using the event monitor 120, the status of such events can be monitored to ascertain which and how many events are awaiting to be resolved (pending to be raised) as well as which and how many events have been already resolved (clear raised).

The event monitor 120 can also provide a list of all events and their corresponding statuses. In some implementations, the event monitor can also display run-time data associated with a selected event and allow its user to delete and/or clear a particular event. The event monitor 120 can provide the following exemplary event statuses: "pending", "pending raised", "raised", and/or "cleared". Other status indicators can be provided as well.

The "pending" indicator can indicate that an event has been created and its event definition has been identified. At this time, an event processing engine associated with the event monitor 120 has not received the event, because it has not been processed and/or because another event for that event definition has been raised and is being processed. The "pending raised" indicator can show that the identified event definition is in the process of being raised by the event processing engine. The "raised" indicator can indicate that the event has been raised and the corresponding event definition has been marked as having been raised. In some implementations, at most one raised event per event definition can exist at any point in time. The "cleared" indicator states that the event was raised in the past and has been cleared. The cleared event information can be kept for historical context purposes and/or can be passed to a job (e.g., an object and/or a process) that can be waiting for the resolution of the event.

In some implementations, the event monitor 120 can be a tool that can provide an insight into a business process and/or an object and/or system state. It can enable users to get an overview of occurrences, problems, and/or any other issues associated with processes/objects and/or system overall. The event monitor can also rank these items in a particular order, such as by an order of importance, urgency, and/or relevance to a specific business process/object, customer, client, etc.

In some implementations, the current subject matter's event monitor can log and/or aggregate various data associated with business process(es)/object(s) for later use. The event monitor 120 can further determine a current state of business process(es)/object(s)/data and/or systems. It can determine real-time relevance of each event monitor-identified item. The event monitor can further ascertain a value of a particular event. The value can be a business value, a monetary value, and/or any other value. The value can be determined by calculating as a function of how much of an influence resolution or a failure to resolve a particular event can have on a client's business. For example, an event monitor identifies an event that relates to a delay in a delivery of a product shipment to a customer. Failure to address this delay (e.g., by sending a substitute shipment on an expedited basis) can have an adverse financial effect on the company, e.g., payment of monetary penalties, loss of future business from the customer, loss of reputation in the industry, etc.

Determination of the value can be used to effectively manage company's business interests, operations, and finances. It can be used to further manage workload of company employees, employee groups and/or teams by directing them to concentrate on the most important and/or urgent events and/or tasks that can have highest impact on the company's business. The determined events can be characterized by a variety of attributes, parameters, data, a particular data (or metadata) structure, requirements, etc. associated with business process(es), object(s), and/or system(s). This data and/or information can be referred to as key figures. In some implementations, the event monitor 120 can use these key figures to provide a user with a user interface that can display various information associated with these events and thereby assist the user in handling these events. Further, the event monitor 120 can be used in one system and/or across various systems that can be independent of their deployment models, components, structure, and/or requirements. These systems can include on-premise systems, cloud-based systems, and/or any other systems.

Figure 2A:
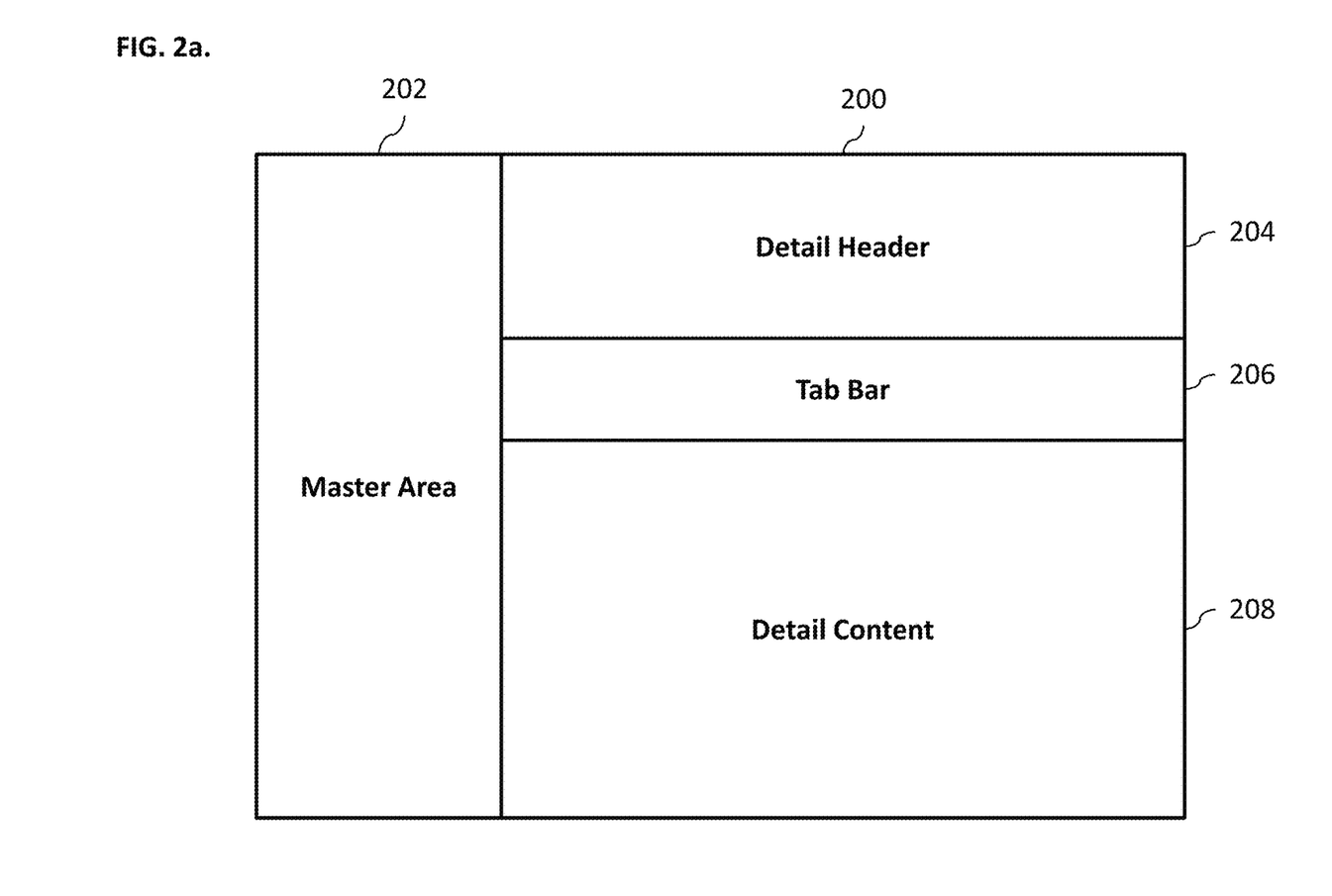
FIGS. 2a-b illustrate exemplary user interfaces for handling various events, according to some implementations of the current subject matter.
Figure 2B:
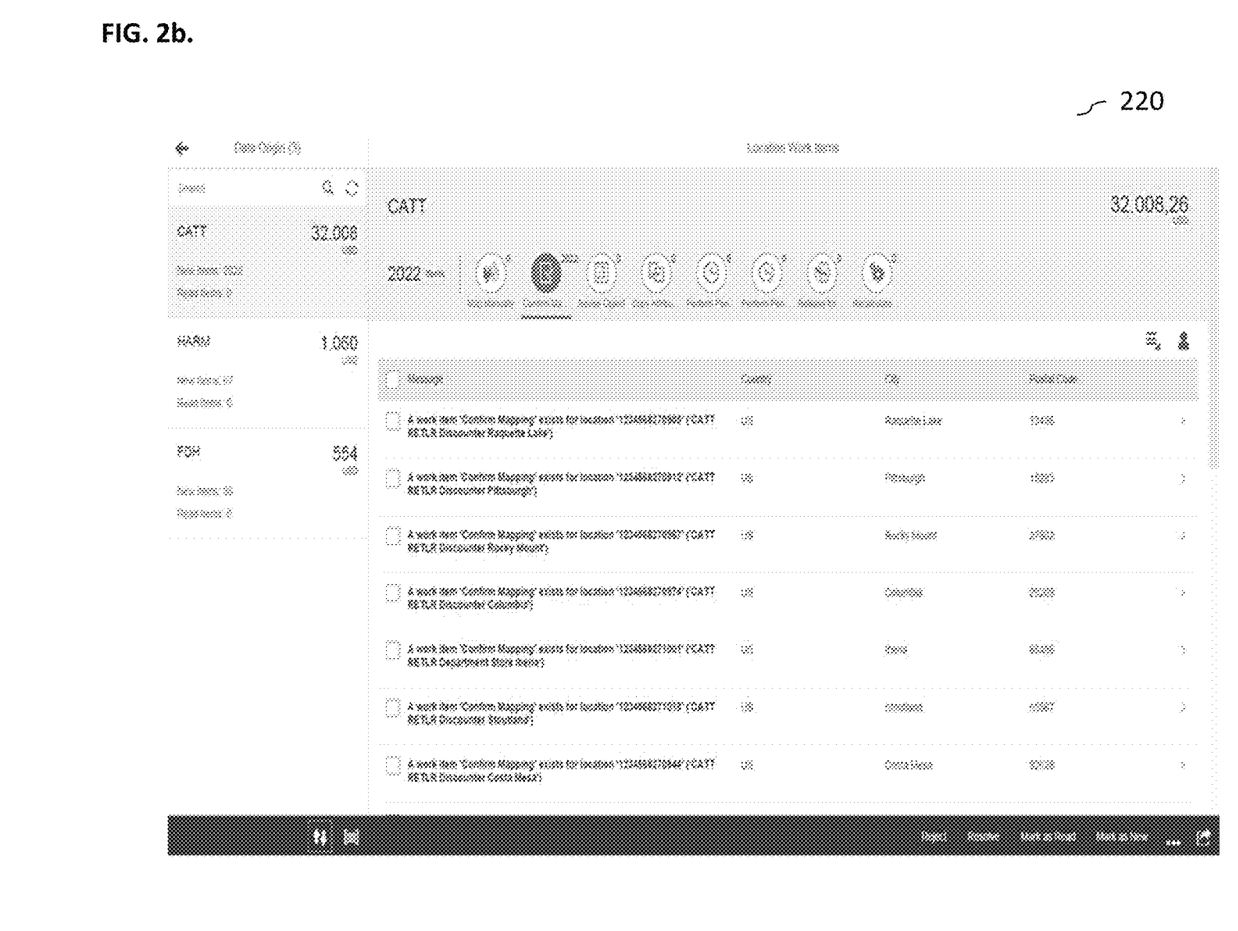

FIG. 2a illustrates an exemplary user interface 200 for handling various events, according to some implementations of the current subject matter. The user interface 200 can a master area 202, a detail header area 204, a tab bar 206, and a detail content area 208. The user interface 200 can represent a frontend of a system 100 that can include one or more business objects and/or processes and/or systems. The frontend of such system can be communicatively coupled to a backend system (as discussed below) that can provide processing capabilities for the actions that can be invoked by a user using the user interface 200 to resolve items identified by the event monitor 120 (shown in FIG. 1). The event monitor 120 can also be communicatively coupled with the backend system 130 to allow for identification and/or monitoring of the events and/or items associated with one or more business object and/or process. FIG. 2b illustrates an exemplary user interface 220, according to some implementations of the current subject matter.

The master area 202 can include information about groups of events or items that can be identified by the event monitor 120 (shown in FIG. 1). The groups of events can include aggregate information for attributes, parameters, data, a particular data (or metadata) structure, requirements, etc. associated with business process(es), object(s), and/or system(s) that have been identified by the event monitor. This aggregate information can be supplied by the backend system upon an appropriate request from the event monitor.

In some implementations, the aggregation of information in the master area 202 can be predetermined upon launching of the user interface 200 and/or can be determined and/or changed by a user. For example, events and/or items identified by the event monitor can be grouped by a geographic region (e.g., North America, South America, Europe, etc.), a country (e.g., United States, Germany, etc.), type of industry (e.g., automotive, agriculture), and/or any other desired attributes and/or parameters. In some implementations, the groupings can contained nested sub-groupings, allowing the user to expand a particular group and narrow down to specific sub-groups to locate specific tasks in a particular area.

In some implementations, upon initiation of the user interface 200, various startup parameters can be used to determine the current entity set (group of settings) of the service for which the user interface was created. When the service is read for the first time, a buffer for the service metadata can be generated. In some implementations, the data associated with the events identified by the event monitor can be dynamically bound to controls of the user interface 200. In some implementations, service data can be bound to controls of the user interface 200 as soon as the user interface 200 is initiated. Various annotations can be used to influence the way the data is displayed and presented in the user interface 200. For example, the annotations can be used to determine positioning of the data in the user interface 200 as well as determine default grouping of data in the master area 202.

In some implementations, a service metadata associated with particular data to be displayed in the user interface 200 can be used for transferring data from the backend system (e.g., servers, databases, etc.) for the purposes of displaying it on the user interface. Any number of properties can be defined for the purposes of organizing and displaying data in the user interface 200. In some implementations, the transferred data (from backend to the user interface 200) can be limited to the data that has been specifically requested by the user, which can ensure that only the requested data is transferred for optimizing overall system performance.

The detail header 204 can include information that can identify data that may have been requested by the user and selected in the master area 202. The user may can select a particular data grouping (e.g., as it relates to events in that grouping) in the master area 202 and then select a specific event that the user may wish to address or work on. Once the event is selected, the header information (e.g., title, client, timing, etc.) can be displayed in the detail header section 204 of the user interface 200.

The tab bar 206 can be used to structure displaying of items in the detail content section 208 of the user interface 200. Various filtering and/or organization (e.g., tabbing, sorting, etc.) techniques can be used to display data in the detail content section 208. The displayed information can be sorted according to various parameters (e.g., products, clients, services, etc.). The organization of data in the detail content area 208 as well as use of the tab bar 206 can be generated dynamically based on metadata associated with the data requested from the backend for display in the user interface 200. In some implementations, the user interface 200 can enable the user to perform various actions on the data displayed in the detail content section 208. This can be performed through use of visual elements such as action "buttons", tabs, checkboxes, pop-up windows, and/or other techniques. These visual elements can be generated dynamically based on the metadata associated with the data that has been requested from the backend system for displaying on the user interface 200. For example, the user interface can display in the detail content section 208 an event that indicates that an authorization is required to release a product shipment for shipping. Along with this detail information, the tab bar 206 can include a checkbox (or an action button) that the user can check (or click) that will authorize shipment, thereby resolving the event. The checkbox (or the action button) can be generated automatically when data related to this event is requested from the backend system and displayed on the user interface 200. In some implementations, position, color, and/or other features of these visual elements (e.g., checkboxes, buttons, etc.) can be determined based on metadata associated with the event. Further, available actions can be defined separately for event, and/or each tab in a plurality of tabs in the tab bar 206.

In some implementations, the event monitor 120 (shown in FIG. 1) can depend on the information that is supplied to it by the backend system 130. The backend system 130 can contain information (e.g., data, metadata, meta-metadata, etc.) about events, key figures, and/or any other parameters that may be associated with events that can be displayed in the user interface 200 (shown in FIG. 2a). In some implementations, each key figure that can be associated with a particular event can be implemented as a separate class. The backend system 130 can allow the user to request for display in the user interface 200 any key figure that may be related to an event. The current subject matter system can also allow the user to define and/or generate a new key figure so that the new key figure can be made available for a display in the user interface 200. The user can use the user interface 200 and/or any other interface to generate appropriate coding and/or implementation for the new key figure. The new key figure can also be provided to the backend system 130 for storage and/or later retrieval, such as, in response to a request from the user.

The backend system 130 can include a plurality of computing devices, database, storage devices, as well as any other hardware, software, and/or any combination of hardware and software. The backend system 130 can be used for responding to request for specific data, key figures, and/or any other information that may be requested by the user. The requests for data can be initiated from the user interface 200. These requests can be generated as a result of the user expanding event lists in the master area, performing searching of specific events, sorting, organizing, etc. data for display in the detail content portion 208 of the user interface 200, as well as performing any other actions in the user interface.

In some implementations, a key figure can include a value or a quantity field that has additional restricting characteristics collected in a basic set, single-dimension set or multi-dimension set that can be linked to the key figure. Key figures that are used frequently can be predefined and entered in key figure sets. Key figures can be entered into reports that include a plurality of columns containing values and quantities associated with key figures, where values and quantities can be stored in various database. The key figures can originate from different versions of data. In some implementations, the key figures can define which value fields that can be displayed in a report (e.g., transaction currency, local currency, group currency, quantity, etc.). Key figures can be combined with additional characteristics to create another key figure. In some implementations, the key figure can include a key figure definition that can be obtained from one or more customizing tables stored at the backend system 130, where the customizing tables can include information concerning specifics of the user's system (e.g., customization parameters, attributes, etc.). The key figure can be associated with appropriate metadata information for displaying in the user interface 200 and render the user interface 200 based on the key figure information. The tab bar 206 can be used to organize the key figure data based on various attributes, details, etc. Additionally, the backend system 130 can also provide supported functionalities corresponding to the backend key figure implementation (e.g., aggregation of data on specified attributes, filter attributes, etc.). In some implementations, key figures can be implemented using Advanced Business Application Programming ("ABAP") language, as developed by SAP SE, Walldorf, Germany. An ABAP object oriented interface, containing methods and/or parameters that can be required for implementation of a key figure, can be used for generation and/or implementation of key figures.

Figure 3:
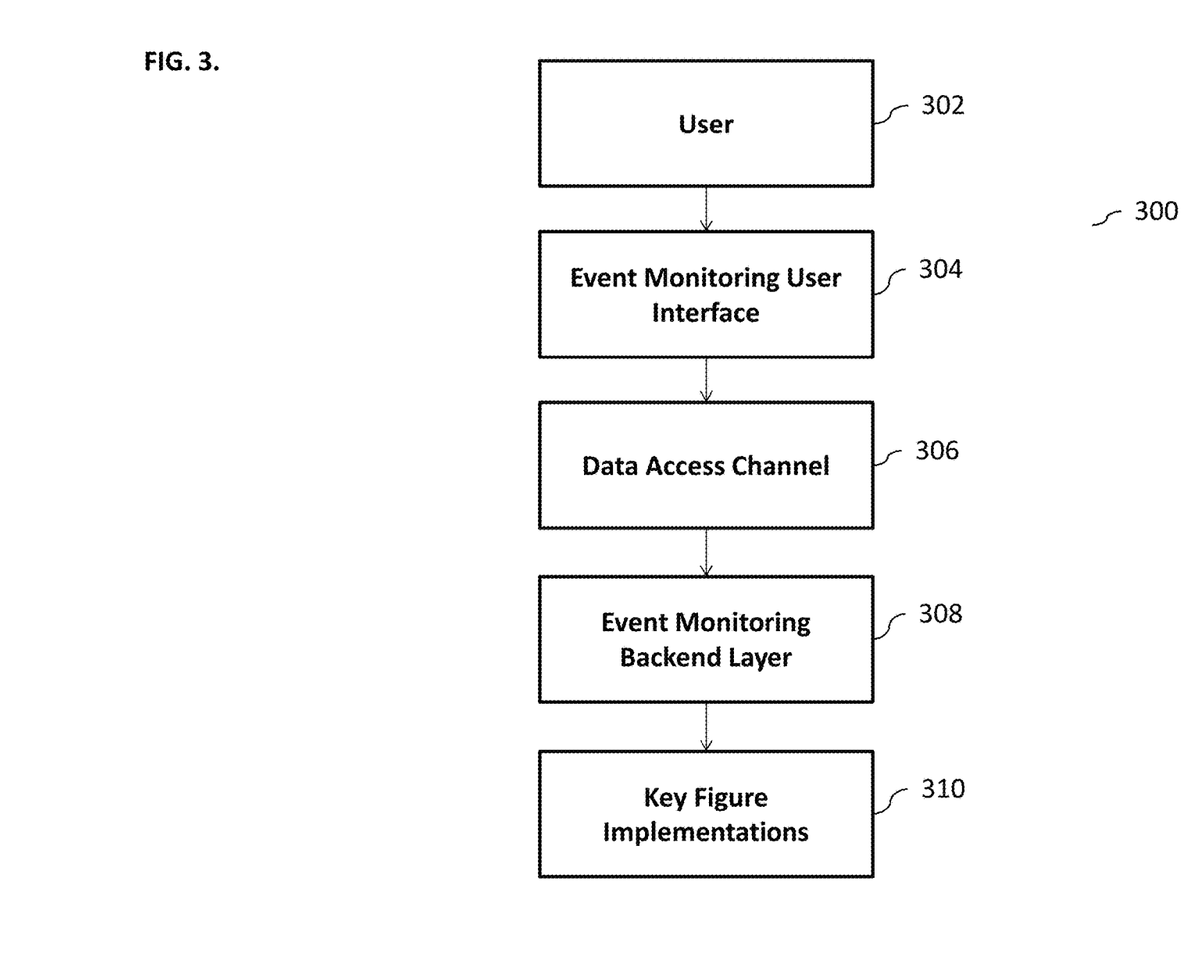
FIG. 3 illustrates an exemplary process for implementation of a key figure, according to some implementations of the current subject matter.

FIG. 3 illustrates an exemplary process 300 for implementation of a key figure, according to some implementations of the current subject matter. At 302-304, the user can access the event monitoring user interface (such as user interface 200 shown in FIG. 2a). The user can desire to view information about a particular event, monitor the event, create a resolution to a particular event, and/or perform any other action. The event monitoring user interface, at 304, as well as the event monitoring backend layer, at 308, can be used to perform event monitoring.

Once the user accessed the user interface, at 304, the user interface can communicate with the backend system (e.g., backend system 130 as shown in FIG. 1) via a data access channel, at 306. The data access channel can be realized in various ways. In some implementations, a gateway channel that uses a generic analytics enablement layer for ABAP can be implemented. In an alternative implementations, a data access layer framework (e.g., business object layer ("BOL") and/or service provider infrastructure ("SPI"), as developed by SAP SE, Walldorf, Germany) can be used. Depending on the key figures requested by the user in the event monitoring user interface, at 304, the backend layer, at 308, obtains appropriate key figure information, at 310, and provides it to the user interface.

Figure 4:
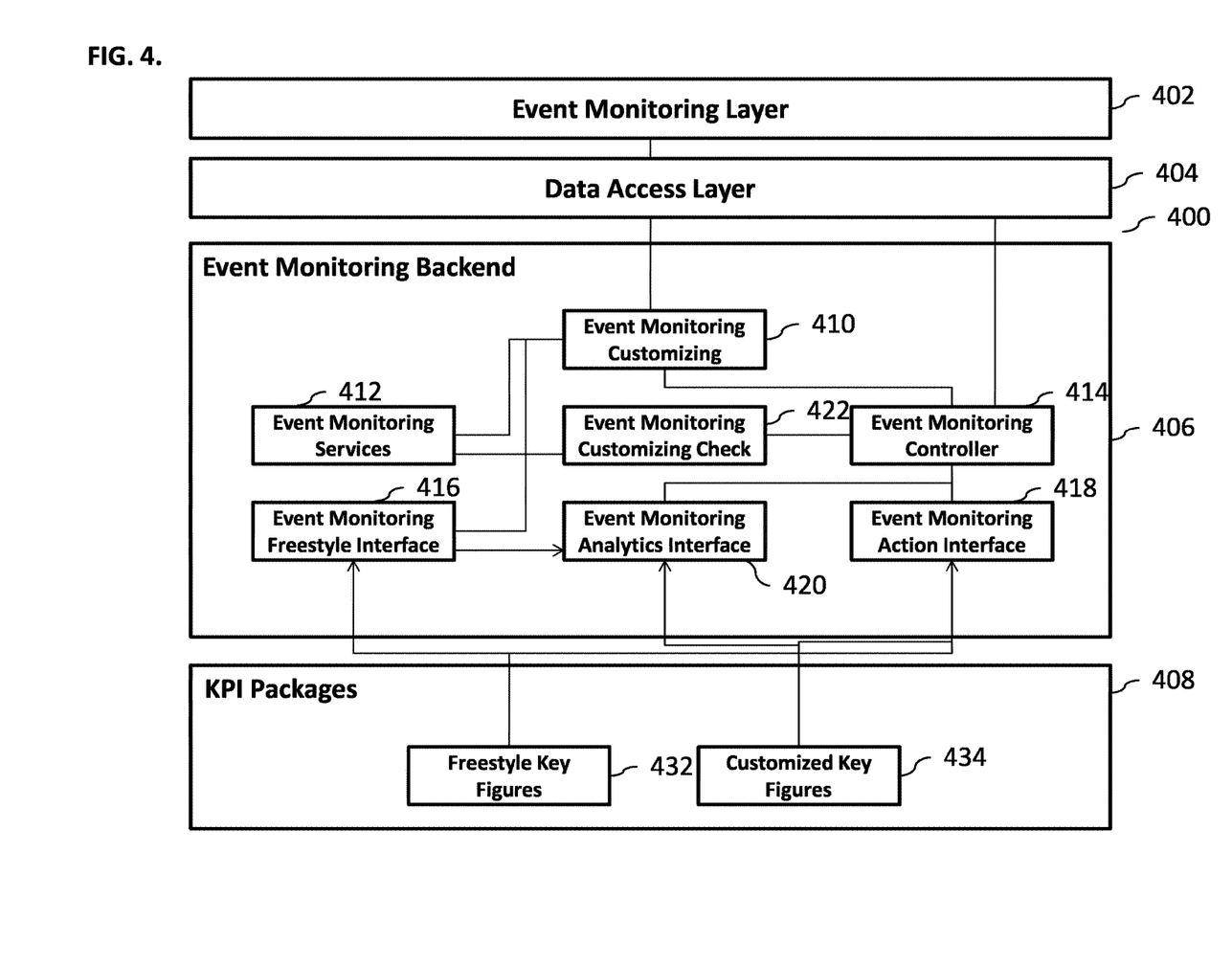
FIG. 4 illustrates an exemplary system that includes a backend system, according to some implementations of the current subject matter.

FIG. 4 illustrates an exemplary system 400 that includes a backend system, according to some implementations of the current subject matter. The backend system shown in FIG. 4 can be similar to the backend system 130 shown in FIG. 1. The system 400 can include one or more computing devices that can communicate with one another using various networks (e.g., wired, wireless, etc.) and/or communication's protocols. The system 400 can include one or more processors, data storage devices, various hardware, software, and/or or any combination of hardware and software.

As shown in FIG. 4, the system 400 can include an event monitoring user interface layer 402, a data access layer 404, an event monitoring backend layer 406, and a key figure/key performance indicator ("KPI") package layer 408. The event monitoring user interface layer 402 can correspond to the event monitoring user interface (such as user interface 200 shown in FIG. 2a). The event monitoring user interface layer 402 can communicate with the event monitoring backend layer 406 via a data access layer 404.

The event monitoring backend layer 406 can include an event monitoring customizing component 410, an event monitoring services component 412, an event monitoring controller component 414, an event monitoring freestyle interface 416, an event monitoring action interface 418, an event monitoring analytics interface 420, and an event monitoring customizing check 422.

The event monitoring customizing component 410 can include a customizable definition of KPIs in addition to definitions of attributes for detail data that can further describe the calculated figures. It can also include a connection to action(s) that can be eventually defined for each KPI, which can bridge the action interface (if so available). The event monitoring action interface 418 can define actions on KPI. Its detail data can be used to take direct action, e.g., to influence the KPI result by manipulation, on underlying business processes or business objects. The interface 418 can be an optional component of a KPI definition. The event monitoring freestyle interface 416 can be a freestyle interface that can enable event monitoring. It can provide and consume a KPI definition layer in addition to the event monitoring customizing. The freestyle interface's settings can be defined in the coding during development, thereby providing an additional delivery method of event/KPI definitions. The event monitoring analytics interface 420 can be an analytics interface that can provide all analytic capabilities that may be needed for evaluation and aggregation of key figures. It can include unified access layer for KPIs that can include detailed functions for a specific KPI instance influenced by the KPI definition provided in the event monitoring customizing or freestyle interface. The event monitoring controller component 414 can orchestrate interaction of definition(s) of KPI with its exposed analytical functions in the analytics interface. To ensure an error-free handling of different settings uses, the controller component 414 elements can utilize monitoring customizing check 422. The event monitoring services component 412 can provide generic methods for the use by the other components, e.g., event monitoring customizing 410.

The backend monitoring layer 406 communicates with the key figure package layer 408 to obtain key figures. In some implementations, the key figures can include freestyle key figures database 432 and customized key figures database 434. The customized key figures database 434 can include customized key figures that can be defined statically using customizing tables and can be specific to a particular user.

The freestyle key figure database 432 can include freestyle key figures. The freestyle key figures can be dynamic and cannot be defined statically. These key figures can be provided dynamically at runtime using various coding and can depend on boundary conditions of the system that can change during time. In some implementations, the freestyle key figures can implement adapter key figures. The adapter key figures can apply in circumstances where there already exists a source of key figure information, e.g., in a different repository of the system and/or from an external data source. In this scenario, it may be cumbersome and/or highly inefficient to model such already available key figures again. In this case, a freestyle key figure implementation can be used and can serve as an adapter between other repositories to the event monitoring. This can allow leveraging existing data sources with a one-time implementation.

Figure 5:
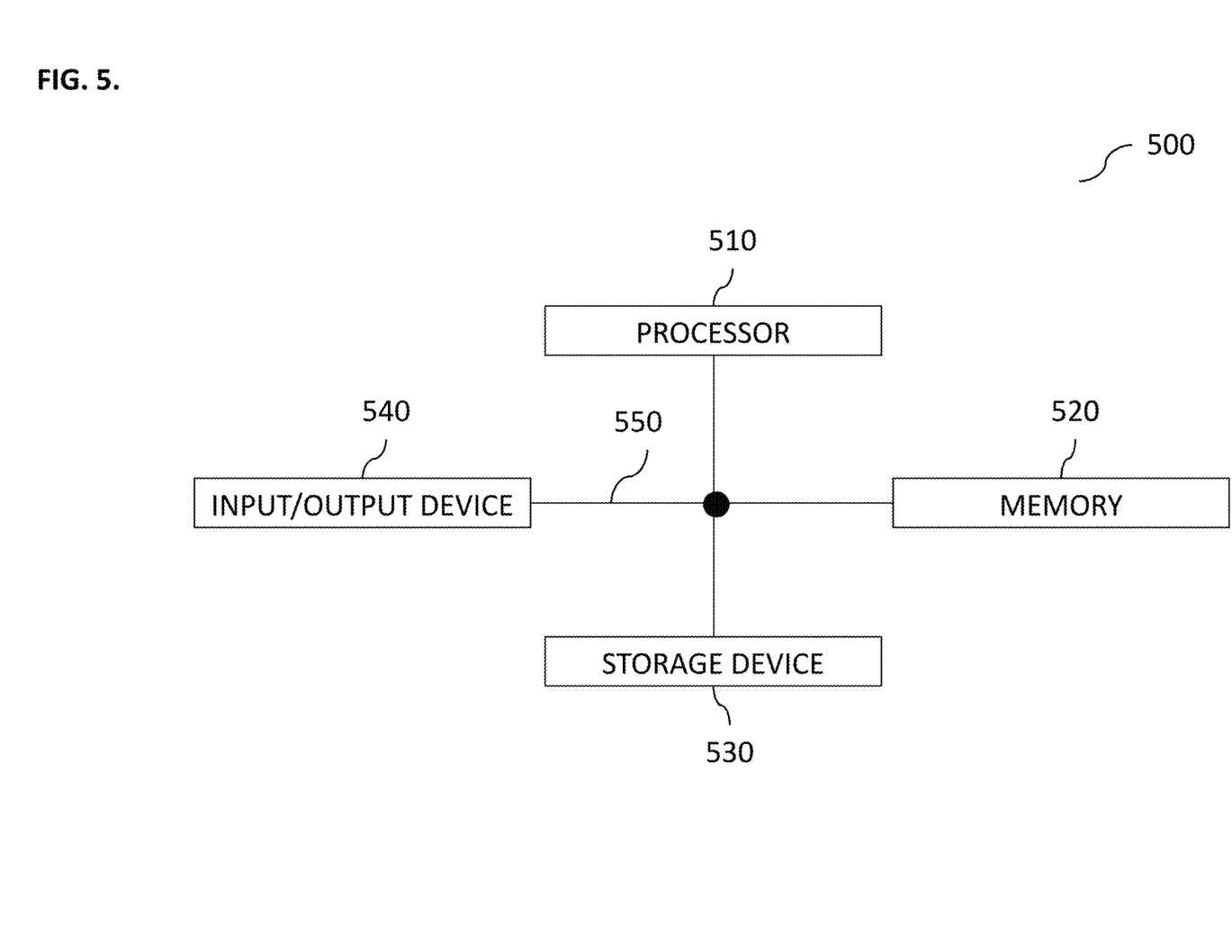
FIG. 5 is an exemplary system, according to some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
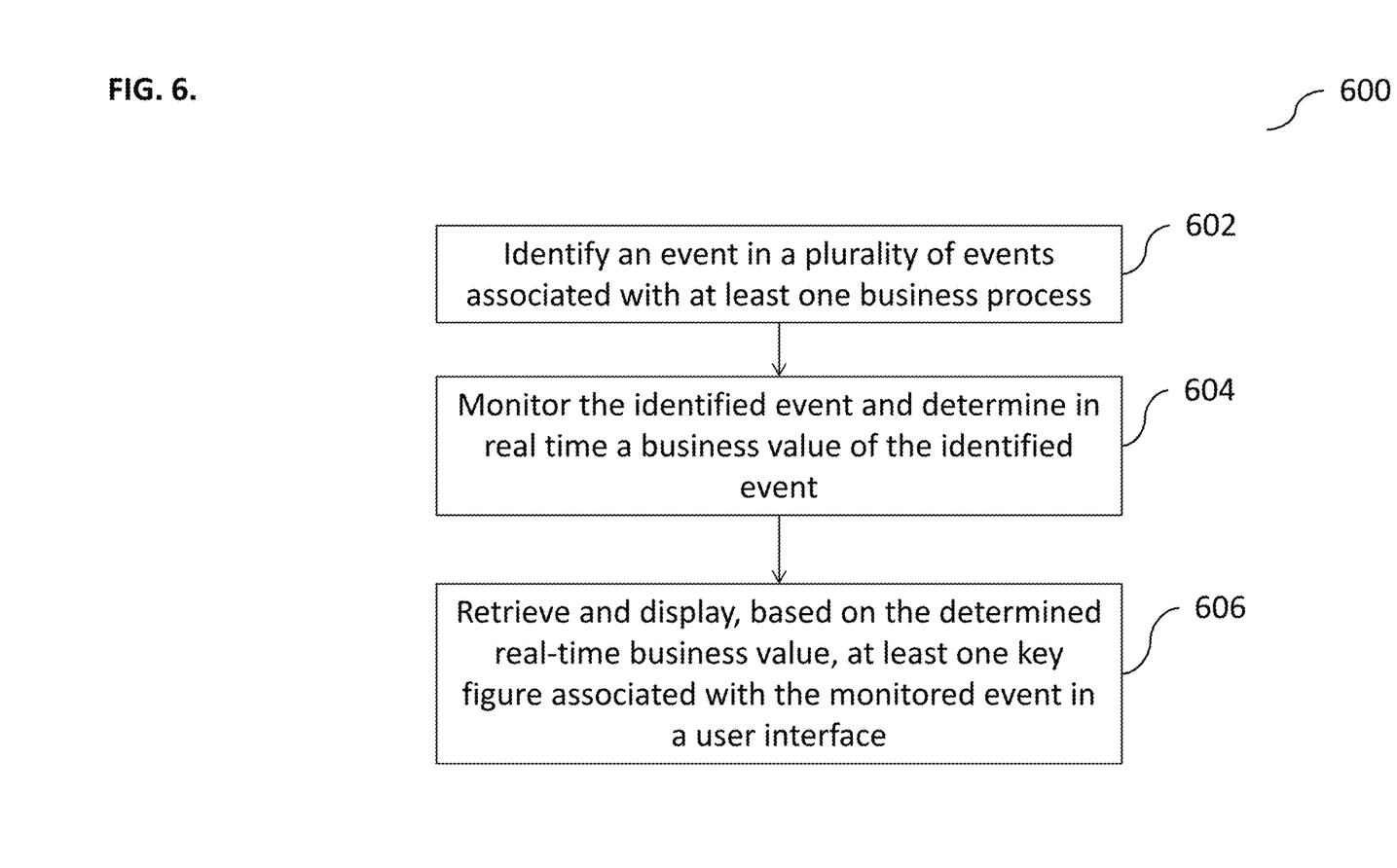
FIG. 6 is an exemplary method, according to some implementations of the current subject matter.

FIG. 6 illustrates an exemplary method 600 for performing event monitoring, according to some implementations of the current subject matter. At 602, an event in a plurality of events associated with at least one business process can be identified. At 604, the identified event can be monitored. A business value of the identified event can be determined in real time. At 606, at least one key figure associated with the monitored event can be retrieved for display in the user interface.

In some implementations, the current subject matter can include one or more of the following optional features. The business value can be determined based on an impact of the identified event on the at least one business process. The user interface can display the plurality of events in the order beginning with a highest impact on the business process. (e.g., highest monetary value).

In some implementations, at least one key figure can include at least one of the following: a static key figure (e.g., a customized key figure generated using customizing tables) generated prior to runtime of the at least one business process and a dynamic key figure (e.g., a freestyle key figure) generated at runtime of the business process. The key figure can be stored in a memory and retrieved by a backend system communicatively coupled to the user interface for displaying on the user interface.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    identifying, by an event monitor backend layer, an event in a plurality of events associated with execution of at least one first process, the event backend layer is communicatively coupled to a frontend computing component, including a user interface, and a backend computing component, including at least an event monitoring customizing component, an event monitoring controller, an event monitoring analytics application programming interface, and an event monitoring action application programming interface, wherein data associated with the identified event is stored in a buffer of the backend computing component and is dynamically bound to a control element of the user interface, the control element of the user interface controlling displaying of the data associated with the identified event on the user interface;
    monitoring, by the event monitor backend layer, the identified event;
    determining, by the event monitor backend layer, based on the monitoring, a state of the execution of the at least one first process, a real-time relevance of the at least one first process with respect to execution of at least one second process, and an effect of failure to execute the at least one first process on the execution of the at least one second process;
    retrieving, by the backend computing component and based on the determining, at least one key figure associated with the monitored event, wherein the at least one key figure includes a static key figure generated prior to runtime of the at least one first process, the retrieving including:
        executing, by the event monitoring controller component,
            generating, by the event monitoring customizing component, at least one customizable definition of the at least one key figure in addition to at least one existing definition associated with the at least one key figure;
            defining, by the event monitoring action application programming interface, at least one action associated with the generated and existing definitions associated with the at least one key figure; and
            identifying, by the event monitoring analytics application programming interface, at least one function for an instance of the at least one key figure based on the generated and existing definitions associated with the at least one key figure; and
    determining positioning, based on the retrieved at least one key figure, of the data associated with the identified event in the user interface.

2. The method according to claim 1, wherein the user interface displays the plurality of events in the order beginning with a highest impact on the at least one first process.

3. The method according to claim 1, wherein the at least one key figure includes a dynamic key figure generated at runtime of the at least one first process.

4. A system comprising: at least one programmable processor; and a non-transitory computer readable storage medium storing instructions that, when executed by the at least one programmable processor, cause the at least one programmable processor to perform operations comprising:
    identifying, by event monitor backend layer, an event in a plurality of events associated with execution of at least one first process, the event monitor backend layer is communicatively coupled to a frontend computing component, including a user interface, and a backend computing component, including at least an event monitoring customizing component, an event monitoring controller, an event monitoring analytics application programming interface, and an event monitoring action application programming interface, wherein data associated with the identified event is stored in a buffer of the backend computing component and is dynamically bound to a control element of the user interface, the control element of the user interface controlling displaying of the data associated with the identified event on the user interface;

monitoring, by the event monitor backend layer, the identified event;

determining, by the event monitor backend layer, based on the monitoring, a state of the execution of the at least one first process, a real-time relevance of the at least one first process with respect to execution of at least one second process, and an effect of failure to execute the at least one first process on the execution of the at least one second process; and retrieving, by the backend computing component and based on the determining, at least one key figure associated with the monitored event, wherein the at least one key figure includes a static key figure generated prior to runtime of the at least one first process the retrieving including:

executing, by the event monitoring controller component, generating, by the event monitoring customizing component, at least one customizable definition of the at least one key figure in addition to at least one existing definition associated with the at least one key figure;

defining, by event monitoring action application programming interface, at least one action associated with the generated and existing definitions associated with the at least one key figure; and identifying, by event monitoring analytics application programming interface, at least one function for an instance of the at least one key figure based on the generated and existing definitions associated with the at least one key figure; and determining positioning, based on the retrieved at least one key figure, of the data associated with the identified event in the user interface.

5. The system according to claim 4, wherein the user interface displays the plurality of events in the order beginning with a highest impact on the at least one first process.

6. The system according to claim 4, wherein the at least one key figure includes a dynamic key figure generated at runtime of the at least one first process.

7. A computer program product comprising a non-transitory computer readable storage medium storing instructions that, when executed by at least one programmable processor, cause the at least one programmable processor to perform operations comprising:

identifying, by event monitor backend layer, an event in a plurality of events associated with execution of at least one first process, the event monitor backend layer is communicatively coupled to a frontend computing component, including a user interface, and a backend computing component, including at least an event monitoring customizing component, an event monitoring controller, an event monitoring analytics application programming interface, and an event monitoring action application programming interface, wherein data associated with the identified event is stored in a buffer of the backend computing component and is dynamically bound to a control element of the user interface, the control element of the user interface controlling displaying of the data associated with the identified event on the user interface;

monitoring, by the event monitor backend layer, the identified event;

determining, by the event monitor backend layer, based on the monitoring, a state of the execution of the at least one first process, a real-time relevance of the at least one first process with respect to execution of at least one second process, and an effect of failure to execute the at least one first process on the execution of the at least one second process; and retrieving, by the backend computing component and based on the determining, at least one key figure associated with the monitored event, wherein the at least one key figure includes a static key figure generated prior to runtime of the at least one first process the retrieving including;

executing, by the event monitoring controller component, generating, by the event monitoring customizing component, at least one customizable definition of the at least one key figure in addition to at least one existing definition associated with the at least one key figure;

defining, by event monitoring action application programming interface, at least one action associated with the generated and existing definitions associated with the at least one key figure; and identifying, by event monitoring analytics application programming interface, at least one function for an instance of the at least one key figure based on the generated and existing definitions associated with the at least one key figure; and determining positioning, based on the retrieved at least one key figure, of the data associated with the identified event in the user interface.

8. The computer program product according to claim 7, wherein the user interface displays the plurality of events in the order beginning with a highest impact on the at least one first process.

9. The computer program product according to claim 7, wherein the at least one key figure includes a dynamic key figure generated at runtime of the at least one first process.

10. The method according to claim 1, wherein the backend layer comprises one or more of a server, a database, a software, a hardware, or other computing device.

11. The system according to claim 4, wherein the backend layer comprises one or more of a server, a database, a software, a hardware, or other computing device.

12. The computer program product according to claim 7, wherein the backend layer comprises one or more of a server, a database, a software, a hardware, or other computing device.

* * * * *